US006842757B1

(12) United States Patent
Winer et al.

(10) Patent No.: US 6,842,757 B1
(45) Date of Patent: Jan. 11, 2005

(54) METHODS AND SYSTEMS FOR DYNAMIC AND DEFAULT ATTRIBUTE BINDING

(75) Inventors: Adam Winer, San Mateo, CA (US); Blake Sullivan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 444 days.

(21) Appl. No.: 10/136,667

(22) Filed: Apr. 30, 2002

(51) Int. Cl.[7] .............................................. G06F 17/30
(52) U.S. Cl. ..................... 707/100; 707/104.1; 715/513
(58) Field of Search ....................... 707/2, 3.4, 10.102, 707/103, 104.1; 715/513

(56) References Cited

U.S. PATENT DOCUMENTS 6,366,934 B1 * 4/2002 Cheng et al. ............... 715/513
6,519,617 B1 * 2/2003 Wanderski et al. ......... 715/513
6,763,499 B1 * 7/2004 Friedman et al. .......... 715/513
6,766,330 B1 * 7/2004 Chen et al. ................ 707/102
6,789,077 B1 * 9/2004 Slaughter et al. ............ 707/10

* cited by examiner

Primary Examiner—Diane D. Mizrahi
Assistant Examiner—Yicun Wu
(74) Attorney, Agent, or Firm—Young Law Firm, P.C.

(57) ABSTRACT

Every attribute or property of an element in a declarative environment such as XML may be bound to an external data source or defaulted when binding fails to resolve. The failure to resolve the binding may be caused by an incorrect key or an unavailable or incorrect data source. The default attribute may be hard coded or may point to another data source where a default value of the attribute may be found.

24 Claims, 2 Drawing Sheets

METHODS AND SYSTEMS FOR DYNAMIC AND DEFAULT ATTRIBUTE BINDING

BACKGROUND OF THE INVENTION

1. Field of the Invention

The present invention generally relates to methods and systems for dynamic and default binding of attributes in declarative environment, such as Extensible Markup Language (XML).

2. Description of the Related Art

Extensible Markup Language (XML) is a standard for creating languages that meet the XML criteria. It is extensible, because data represented according to the XML standard may be marked up in any manner desired. For example, unlike Hyper Text Markup Language (HTML), the developer is free to add previously undefined tags to an XML document and an XML parser will be able to read the document. An XML document is a structured file. More particularly, XML documents are structured as hierarchies of information.

XML document contain one or more elements (which must adhere to a limited set of rules), the boundaries of which are either delimited by start-tags and end-tags, or, for empty elements, by an empty-element tag. Each element has a type, identified by name, sometimes called its "generic identifier" (GI), and may have a set of attribute specifications. Each attribute may be data bound to simple text, to a data source inside an application or to, for example, a JAVA method that, when called, returns data. The attribute or attributes serve to describe the element and do not further specify the parent-child relationship of the element within the document. Each attribute specification has a name and a value. Attributes, therefore, are name/value pairs that may be associated with an element. Attributes provide additional information about an element and may be used to attach characteristics or properties to the elements of a document. An element may have more than one attribute. Attributes are represented by an attribute name followed by an equal sign and the attribute value in quotation marks, such as:

<TITLE> <LANGUAGE lang="US-English">Oracle11i Server Concepts </LANGUAGE> </TITLE>

In this example, the TITLE element contains another element, the LANGUAGE element. The LANGUAGE element has one attribute "lang", which evaluates to the value of "US-English". The contents of the TITLE element are the string "Oracle 11i Server Concepts".

Declarative languages such as XML commonly utilize document model against which the hierarchically structured electronic document are validated by a parser. The model document may be a Document Type Definition (DTD) syntax or an XML Schema, for example. XML Schemas, for example, are defined at www.w3.org. Section 3.3.2 of the W3C XML specification describes the manner in which an attribute is declared in a Schema. A default value for an attribute may be declared in a Schema and such declared default will be used when that attribute is not declared during usage. Indeed, according to this section, when an XML processor encounters an omitted value, it is to behave as though the attribute were present with the declared default value. For example, in the document model—such as an XML Schema or Document Type Definition (DTD) that is used to validate the current document and to define the elements thereof, an exemplary metasyntactical element <foo> may be defined. In the document model, it may be specified that if the attribute "bar" of the element <foo> is not used, then it defaults to some value. In the XML document, then the expression <foo bar="example"> the attribute "bar" would be evaluated to "example", as expected. However, if the element <foo> is used alone (i.e., without the attribute "bar"), then the "bar" attribute would resolve to some value when it isn't explicitly specified. As noted above, the normal defaulting mechanism of XML forces the default value to be specified in the document model (i.e., the Schema or DTD) for all usages.

It is not always practical to hard code the value of an attribute in the document model. For example, the specific value of an attribute may be located in a remote data source and the value of the attribute may be declared as the location of the data source. Moreover, the location of the data source containing the value of the attribute may have been incorrectly declared, which results in a failure of the attribute evaluation (i.e., the process of assigning a value to the attribute name). Alternatively, the data source itself (whether a method returning a value, a remote server or other data resource) may fail, be unavailable or otherwise unable to provide the specified value of the attribute. In such cases, the attribute evaluation also fails. What are needed, therefore, are methods and systems for handling the case wherein the attribute evaluation fails, for whatever reason. What are also needed are mechanisms for specifying default values outside of the document model; that is, mechanisms that enable the default values of attributes to be changed from use to use, such as in more than one namespace. What are also needed are methods and systems for dynamic fallback attribute binding in a declarative environment, such as, for example, XML.

SUMMARY OF THE INVENTION

It is, therefore, an object of the present invention to provide methods and systems for dynamic fallback attribute binding in a declarative environment such as XML.

In accordance with the above-described objects and those that will be mentioned and will become apparent below, a computer implemented method for evaluating an attribute of an element in a declarative environment, according to an embodiment of the present invention, may include steps of declaring the attribute of the element, the declared attribute including the name of the attribute and an identification of a first data source containing the value of the declared attribute; defining one or more fallback data sources containing a fallback value of the declared attribute, the defined fallback data source(s) being configured to supply the fallback value of the declared attribute upon failure of the identified first data source to provide the value of the declared attribute; evaluating the declared attribute by fetching the value of the attribute from the first data source, and upon failure of the evaluating step, successively attempting to evaluate the declared attribute from the fallback data source(s) by fetching the fallback value of the declared attribute from one of the fallback data sources or by evaluating the declared attribute to a predetermined static value.

The evaluating step may fetch the value of the attribute from the first data source across a computer network. The value of the declared attribute may include an identification of a row within a table of a database, a file, a resource bundle and/or a method, for example. The declarative environment may conform to the XML standard, for example. A step of declaring a default static value of the declared attribute may be carried out, the declared attribute evaluating to the default static value upon failure of the first data source and the at least one fallback source to provide the value and the fallback value, respectively, of the declared attribute. The identification of the first data source may include a location of the value of the declared attribute. The defined fallback data source may include a location of the fallback value of the declared attribute. The first data source may be data bound to the declared attribute.

The present invention may also be viewed as a computer system configured for evaluating an attribute of an element in a declarative environment, comprising: at least one processor; at least one data storage device; a plurality of processes spawned by the at least one processor, the processes including processing logic for declaring the attribute of the element, the declared attribute including a name of the attribute and an identification of a first data source containing a value of the declared attribute; defining at least one fallback data source containing a fallback value of the declared attribute, the at least one defined fallback data source being configured to supply the fallback value of the declared attribute upon failure of the identified first data source to provide the value of the declared attribute; evaluating the declared attribute by fetching the value of the attribute from the first data source, and upon failure of the evaluating step, successively attempting to evaluate the declared attribute from the at least one fallback data sources by fetching the fallback value of the declared attribute from one of the at least one fallback data sources or by evaluating the declared attribute to a predetermined static value.

According to still another embodiment thereof, the present invention may be viewed as a machine-readable medium having data stored thereon representing sequences of instructions which, when executed by computing device, causes the computing device to evaluate an attribute of an element in a declarative environment by performing the steps of declaring the attribute of the element, the declared attribute including a name of the attribute and an identification of a first data source containing a value of the declared attribute; defining at least one fallback data source containing a fallback value of the declared attribute, the at least one defined fallback data source being configured to supply the fallback value of the declared attribute upon failure of the identified first data source to provide the value of the declared attribute; evaluating the declared attribute by fetching the value of the attribute from the first data source, and upon failure of the evaluating step, successively attempting to evaluate the declared attribute from the at least one fallback data sources by fetching the fallback value of the declared attribute from one of the at least one fallback data sources or by evaluating the declared attribute to a predetermined static value.

BRIEF DESCRIPTION OF THE DRAWINGS

For a further understanding of the objects and advantages of the present invention, reference should be had to the following detailed description, taken in conjunction with the accompanying figures, wherein.

DESCRIPTION OF THE INVENTION

Functional Description

Figure 1:
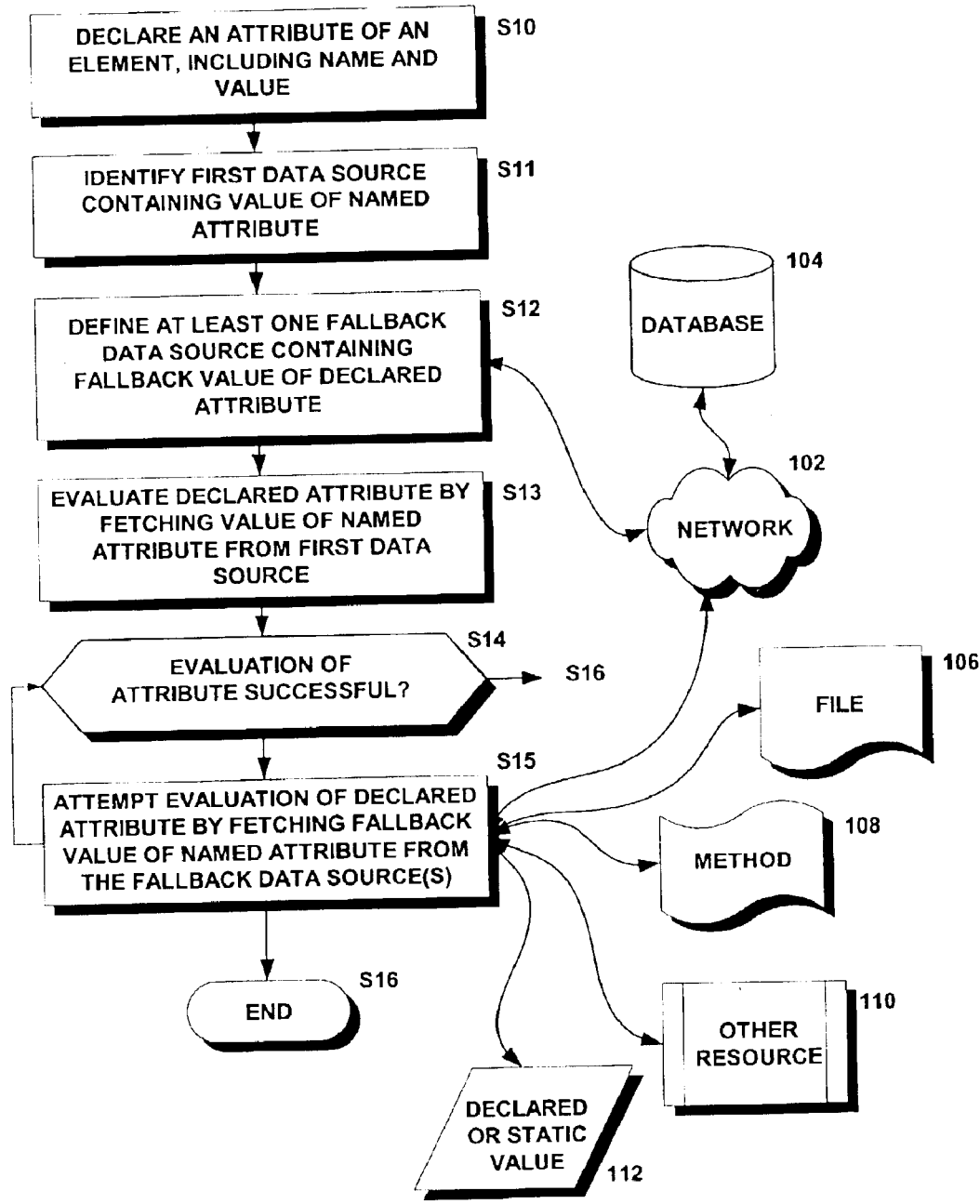
FIG. 1 is a flowchart of a method for evaluating an attribute of an element in a declarative environment, according to an embodiment of the present invention.

FIG. 1 is a flowchart of a method for evaluating an attribute of an element in a declarative environment (as opposed to an imperative environment in which explicit sequences of steps are specified to produce a desired result), according to an embodiment of the present invention. As shown therein, a computer-implemented method for evaluating an attribute of an element in a declarative environment may include the following steps. The first step, as indicated at step S10, is to declare an attribute of an element. The declared attribute includes the name of the attribute and an identification of a first data source containing a value of the declared attribute, as called for by step S11. Such first data source may be or include (for example) a database (such as shown at 104) in which the value of the attribute is stored, a method 108 that returns the value of the attribute when called, a file 106, or any resource 110, whether local or remote and accessed over a computer network 102. For example, the first data source may be a JAVA method, in which case the name of the class and the name of the method are specified. Moreover, with appropriate glue code, the first data source may be specified as an http address on the Internet, for example. To increase the robustness of the attribute declaration, among other advantages, the present invention provides for defining a fallback value or one or more fallback data sources containing or configured to return a fallback value of the declared attribute that is valid for this attribute declaration. The fallback value may be a static or explicitly declared value 112 or may be stored, generated or otherwise provided by one of the fallback data sources. The fallback data source(s), according to the present invention, may be configured to supply the fallback value of the declared attribute upon failure of the identified first data source to provide the value of the declared attribute. As shown at S13, the declared attribute may then be evaluated by fetching or receiving the value thereof from the first data source. At S14, it may then determined whether the evaluation of S13 has been successful. That is, it is determined whether the value of the declared attribute was successfully fetched from the first data source. If successful, the present method ends at S16.

If however, the evaluation of S13 was not successful, step S15 may be carried out. As shown, S15 calls for an attempt to evaluate the declared attribute by fetching the fallback value of the declared attribute from the fallback data source (s). This step may be repeated upon each failure to evaluate the named attribute by successively fetching the fallback value from the fallback data sources, depending upon the number of fallback data sources defined in the attribute declaration. In XML, this may be accomplished by data binding the first data source to the attribute and declaring a default value to which the attribute evaluates if the first data source fails to return the value of the attribute. For example, the following XML notation may be used:

<foo data:bar="key@datasource" bar="myDefault">

In this example, the value of the declared foo attribute for this particular usage may be found at key@datasource, where "key" is a specified key within the "datasource" data source. For example, "key" may specify a particular column within a predefined row of the "datasource" database. In general, "key@datasource" may include any unique identifier that is operative to uniquely identify the desired value of the declared attribute. Data binding the attribute in this manner and declaring a fallback value for the declared attribute enables the value of the declared attribute to fallback on the fallback value thereof upon failure of the evaluation of the data bound attribute. For example, if "datasource" is unavailable (or does not exist), was incorrectly specified or if the specified "key" is not a valid key to the data source "datasource", the evaluation would fail and the attribute foo would evaluate to the declared fallback value; namely, the exemplary string "myDefault". In standard XML, the attribute "bar" cannot default to "myDefault" for each usage thereof (across different namespaces, for example). Instead, the default value "myDefault" would have to have been previously declared in a model document (such as a Schema or Document Type Definition—DTD) against which the document is to be validated.

The specified data sources may be local data sources, or may be remote data sources and accessible over a computer network such as shown at 102 in FIG. 1 and the identification of the first data source and/or the fallback data source(s) may include a location of the data source on such a computer network, for example.

Hardware Description

Figure 2:
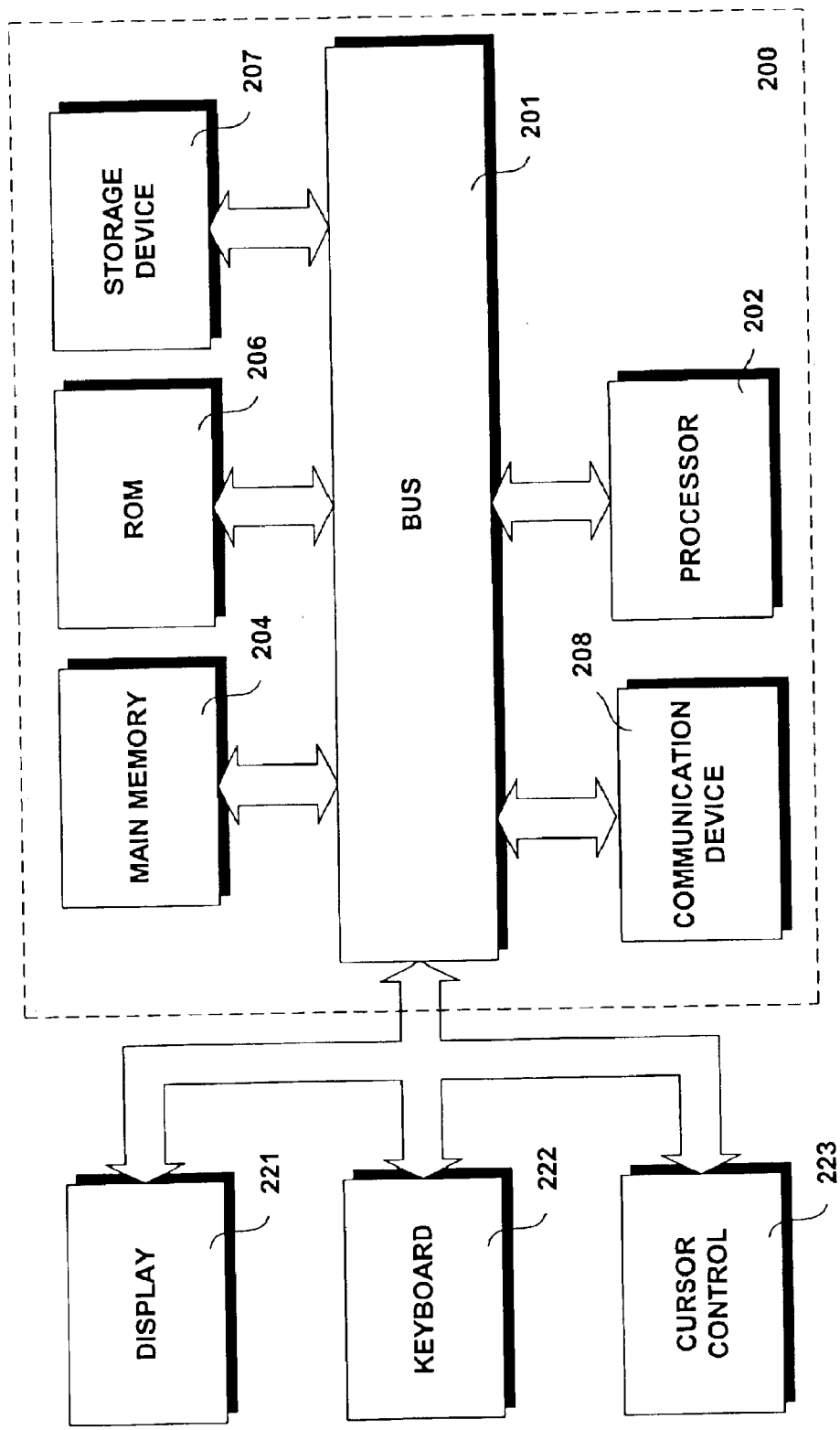
FIG. 2 is a block diagram of a computer with which the present invention may be practiced.

FIG. 2 illustrates a block diagram of a computing device 200 with which an embodiment of the present invention may be implemented. Computing device 200 (such as server 204, for example) includes a bus 201 or other communication mechanism for communicating information, and a processor 202 coupled with bus 201 for processing information. Computing device 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computing device 200 may also include a read only memory (ROM) and/or other static storage device 206 coupled to bus 201 for storing static information and instructions for processor 202. A data storage device 207, such as a magnetic disk or optical disk, may be coupled to bus 201 for storing information and instructions. A communication device 208, such as a modem or network (such as Ethernet, for example) card is also coupled to the bus 401 to provide access to a network, such as shown at 102 in FIG. 1.

The computing device 200 may also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device might be the user's own voice or cursor control 223, such as a mouse, a trackball, or cursor direction keys for communicating direction information and command selections to processor 202 and for controlling cursor movement on display 221.

The present invention is related to the use of computing device 200 configured to evaluate an attribute of an element in a declarative environment (such as, for example, XML) according to the present invention, as disclosed above. According to one embodiment, the processing may be carried out by one or more computing devices 200 in response to processor(s) 202 executing sequences of instructions contained in memory 204. Such instructions may be read into memory 204 from another computer-readable medium, such as data storage device 207 and/or from a remotely located server. Execution of the sequences of instructions contained in memory 204 causes processor(s) 202 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present to invention. Thus, the present invention should be limited only by the claims as set forth below.

What is claimed is:

1. A computer implemented method for evaluating an attribute of an element in a declarative environment, comprising:

declaring the attribute of the element, the declared attribute including a name of the attribute and an identification of a first data source containing a value of the attribute;

defining at least one fallback data source containing a fallback value of the declared attribute, the at least one defined fallback data source being configured to supply the fallback value of the declared attribute upon failure of the identified first data source to provide the value of the declared attribute;

evaluating the declared attribute by fetching the value of the attribute from the first data source, and upon failure of the evaluating step, successively attempting to evaluate the declared attribute from the at least one fallback data sources by fetching the fallback value of the declared attribute from one of the at least one fallback data sources or by evaluating the declared attribute to a predetermined static value.

2. The computer implemented method of claim 1, wherein the evaluating step fetches the value of the attribute from the first data source across a computer network.

3. The computer implemented method of claim 1, wherein the value of the declared attribute includes one of an identification of a row within a table of a database, a file, a resource bundle and a method.

4. The computer implemented method of claim 1, wherein the declarative environment includes Extendible Markup Language (XML).

5. The computer implemented method of claim 1, further including a step of declaring a default static value of the declared attribute, the declared attribute evaluating to the default static value upon failure of the first data source and the at least one fallback source to provide the value and the fallback value, respectively, of the declared attribute.

6. The computer implemented method of claim 1, wherein the identification of the first data source includes a location of the value of the declared attribute.

7. The computer implemented method of claim 1, wherein the defined fallback data source includes a location of the fallback value of the declared attribute.

8. The computer implemented method of claim 1, wherein the first data source is data bound to the declared attribute.

9. A computer system configured for evaluating an attribute of an element in a declarative environment, comprising:

at least one processor;

at least one data storage device;

a plurality of processes spawned by the at least one processor, the processes including processing logic for:

declaring the attribute of the element, the declared attribute including a name of the attribute and an identification of a first data source containing a value;

defining at least one fallback data source containing a fallback value of the declared attribute, the at least one defined fallback data source being configured to supply the fallback value of the declared attribute upon failure of the identified first data source to provide the value of the declared attribute;

evaluating the declared attribute by fetching the value of the attribute from the first data source, and upon failure of the evaluating step, successively attempting to evaluate the declared attribute from the at least one fallback data sources by fetching the fallback value of the declared attribute from one of the at least one fallback data sources or by evaluating the declared attribute to a predetermined static value.

10. The computer system of claim 9, wherein the evaluating step fetches the value of the attribute from the first data source across a computer network.

11. The computer system of claim 9, wherein the value of the declared attribute includes one of an identification of a row within a table of a database, a file, a resource bundle and a method.

12. The computer system of claim 9, wherein the declarative environment includes Extendible Markup Language (XML).

13. The computer system of claim 9, further including a step of declaring a default static value of the declared attribute, the declared attribute evaluating to the default static value upon failure of the first data source and the at least one fallback source to provide the value and the fallback value, respectively, of the declared attribute.

14. The computer system of claim 9, wherein the identification of the first data source includes a location of the value of the declared attribute.

15. The computer system of claim 9, wherein the defined fallback data source includes a location of the fallback value of the declared attribute.

16. The computer system of claim 9, wherein the first data source is data bound to the declared attribute.

17. A machine-readable medium having data stored thereon representing sequences of instructions which, when executed by computing device, causes the computing device to evaluate an attribute of an element in a declarative environment by performing the steps of:

declaring the attribute of the element, the declared attribute including a name of the attribute and an identification of a first data source containing a value of the attribute;

defining at least one fallback data source containing a fallback value of the declared attribute, the at least one defined fallback data source being configured to supply the fallback value of the declared attribute upon failure of the identified first data source to provide the value of the declared attribute;

evaluating the declared attribute by fetching the value of the attribute from the first data source, and upon failure of the evaluating step, successively attempting to evaluate the declared attribute from the at least one fallback data sources by fetching the fallback value of the declared attribute from one of the at least one fallback data sources or by evaluating the declared attribute to a predetermined static value.

18. The machine-readable medium of claim 17, wherein the evaluating step fetches the value of the attribute from the first data source across a computer network.

19. The machine-readable medium of claim 17, wherein the value of the declared attribute includes one of an identification of a row within a table of a database, a file, a resource bundle and a method.

20. The machine-readable medium of claim 17, wherein the declarative environment includes Extendible Markup Language (XML).

21. The machine-readable medium of claim 17, further including a step of declaring a default static value of the declared attribute, the declared attribute evaluating to the default static value upon failure of the first data source and the at least one fallback source to provide the value and the fallback value, respectively, of the declared attribute.

22. The machine-readable medium of claim 17, wherein the identification of the first data source includes a location of the value of the declared attribute.

23. The machine-readable medium of claim 17, wherein the defined fallback data source includes a location of the fallback value of the declared attribute.

24. The machine-readable medium of claim 17, wherein the first data source is data bound to the declared attribute.

* * * * *